United States Patent [19]

Timmons et al.

[11] Patent Number: 4,725,218

[45] Date of Patent: Feb. 16, 1988

[54] APPARATUS FOR FOLDING TAPE

[75] Inventors: Frank Timmons, Richmond, Ind.; John H. Koulouthros, Franklin Lakes, N.J.

[73] Assignee: Facile Technologies, Inc., Paterson, N.J.

[21] Appl. No.: 877,378

[22] Filed: Jun. 23, 1986

[51] Int. Cl.[4] ........................ B29C 61/10; B29C 53/02

[52] U.S. Cl. ........................................ 425/383; 72/468; 493/440; 493/446; 493/455

[58] Field of Search ................ 425/334, 383, 391, 182; 264/339, 295, 285; 493/438, 439, 440, 455, 456, 446, 447; 156/199, 227, 461; 72/467, 468

[56] References Cited

U.S. PATENT DOCUMENTS

| | | | |
|---|---|---|---|
| 368,166 | 8/1887 | Plamondon et al. | 156/461 |
| 836,235 | 11/1906 | Adams | 493/438 |
| 927,502 | 7/1909 | De Smith | 493/439 |
| 1,476,967 | 12/1923 | Hedly | 72/46 R |
| 2,292,840 | 8/1942 | Martindell et al. | 493/440 |
| 2,544,044 | 3/1951 | Reber et al. | 493/439 |
| 2,819,657 | 1/1958 | Hammerstrom | 493/439 |
| 3,296,986 | 1/1967 | Gansl | 493/440 |

FOREIGN PATENT DOCUMENTS

| | | | |
|---|---|---|---|
| 505092 | 7/1927 | Fed. Rep. of Germany | 493/440 |
| 689982 | 8/1953 | United Kingdom | 493/447 |

*Primary Examiner*—Willard E. Hoag

[57] ABSTRACT

A pair of facing die sections, preferably constructed of machinable plastic, are biased toward one another and their central regions are spaced to form a shallow gap. Each die section is provided with a tapered folding chamber whose wide end is open at the upstream end of the die section. Each chamber communicates with the gap by means of a shallow slot that extends longitudinally, or in the direction of travel of a tape that is drawn through the gap. The edges of the tape enter the folding chambers as the central main section of the tape enters the upstream end of the gap. While the tape edges are in the chamber they are curled and directed through the slots into the gap. By the time the edges leave the chambers these edges are folded to lie flat against opposite sides of the main section of tape. Means are provided for adjusting the die sections to operate on different widths of tape and to produce desired widths for the folded edges.

18 Claims, 10 Drawing Figures

WIDTH ADJUST.

APPARATUS FOR FOLDING TAPE

BACKGROUND OF THE INVENTION

The invention relates to drawing-type dies in general and more particularly related to die means for folding at least one edge of a tape to overlie the main central portion thereof.

So-called folded tape shields have been used for many years to protect electronic cables from the intrusion of unwanted signals. A tape of this kind comprises a thin insulating layer of plastic such as polyester, polypropylene and Teflon. One side of the tape is laminated with a thin conducting layer or foil of metal such as aluminum and copper. Preferably, both of the tape edges are folded inward in directions such that the foil of one edge is exposed and the plastic of the other edge is exposed. Typically, the shield is formed by spiral wrapping the tape around a group of insulation covered conductors in a manner such that the metal exposed folded edge surface makes good electrical contact with the conducting layer of the tape's main central portion. Folding of the other edge to produce a fold having an exposed insulating film assures that the exposed edge of the tape does not have an edge of raw metal.

While the merits of folded tape shields have been virtually undisputed, the relatively high cost of tape folding tools has severely limited the production of such shields. That is, folding tool costs have been relatively high because of inherently expensive constructions and the fact that the prior art folding tools were usually constructed so that they were not adjustable for different tape widths and were not adustable to produce different widths for the folded over edges. Further, prior art tape folding tools were constructed of metal which developed relatively high friction forces as the tape moved through the forming openings of the tools. These friction forces generated heat and drag on the tape resulting in uncontrolled stretching of the tape and, in many cases, reducing the useful fatigue life thereof after the folded tape shields were placed in service. This undesirable friction also resulted in abrasion of the metal faces of the tape shields.

SUMMARY OF THE INVENTION

To overcome the foregoing problems of the prior art, the instant invention provides die apparatus in which opposed die members are constructed of plastic insulating material, such as nylon, Teflon, Corian and acrylic. The particular type of plastic used for the die members is relatively hard and can be drilled and cut cleanly. In a manner of speaking, the tape that is drawn between the die sections is lubricated by the material of which the die sections is constructed.

Each of the die sections is provided with a conical chamber which extends downstream from the upstream edge of the die apparatus to a position approximately midway between the upstream and downstream edges of the die apparatus, and the base of the cone is open to provide a relatively large entrance for the tape edges. The walls of the conical chamber serve to curl a tape edge inward and direct same to a longitudinally extending opening that communicates between the interior of the cone chamber and the shallow working gap between the die member where the folded edge lies flat against the main central section of the tape.

As will be explained in greater detail hereinafter, the tape folding tools of the instant invention are constructed so that it is a simple matter for adjusting same to handle tapes of different widths as well as to produce folded edges of different widths. In addition, it is a simple matter to adjust die pressure (pressure transverse to direction of tape travel) on the tape while it is moving through the die means.

Accordingly, a primary object of the instant invention is to provide novel improved die means for inwardly folding at least one edge of a tape.

Another object is to provide a die means of this type that is relatively inexpensive.

Still another object is to provide a die means of this type which produces a superior product.

A further object is to provide a die means of this type that is readily adjustable for use with tapes of different widths, and to produce folded edges of different widths.

A still further object is to provide die means of this type in which inward folding of the tape edges is achieved to a great extent by the contouring of tapered folding chambers.

BRIEF DESCRIPTION OF THE DRAWINGS

These objects as well as other objects of this invention shall become readily apparent after reading the following description of the accompanying drawings in which:

In FIGS. 8A–8C, the thickness of the tape is exaggerated greatly.

DETAILED DESCRIPTION OF THE PREFERRED EMBODIMENT

Figures 1, 2:
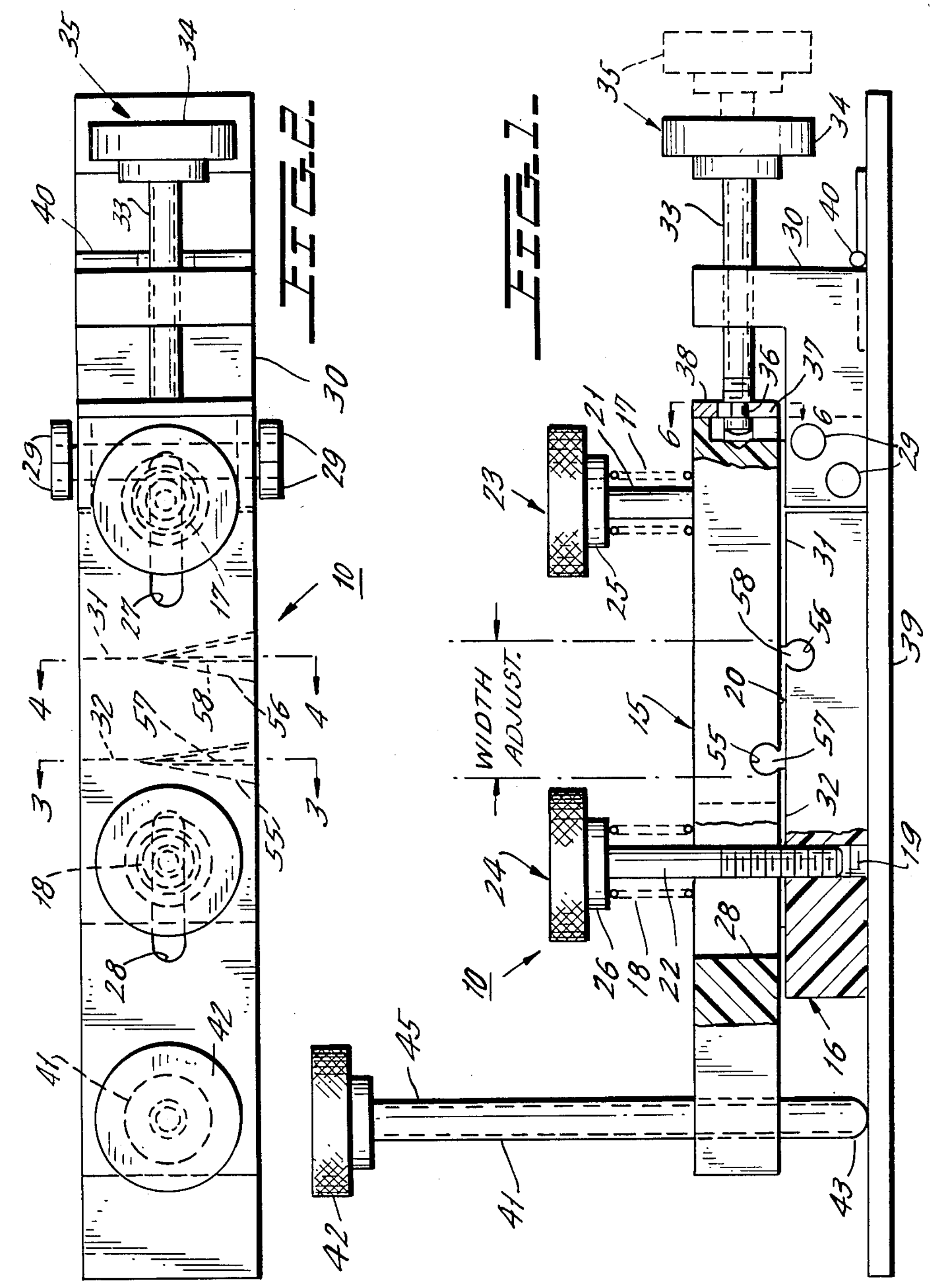
FIG. 1 is an elevation looking at the upstream edge of tape folding die means constructed in accordance with teachings of the instant invention.
FIG. 2 is a plan view of the die means of FIG. 1.
Figure 3:
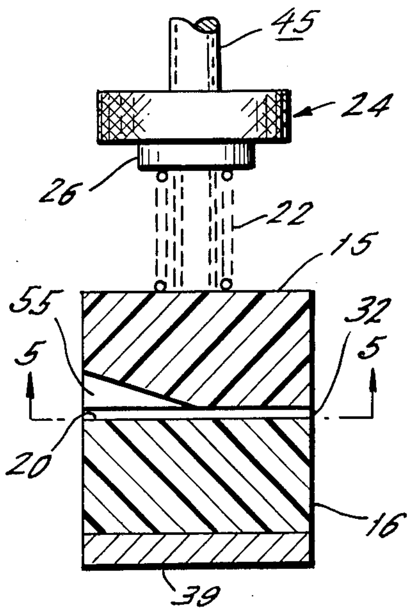
FIGS. 3 and 4 are cross-sections taken through the respective lines 3—3 and 4—4 in FIG. 2 looking in the direction of the respective arrows 3—3 and 4—4.
Figure 4:
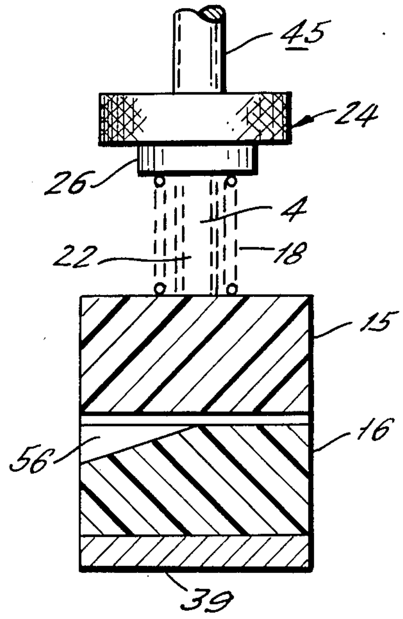
Figure 5:
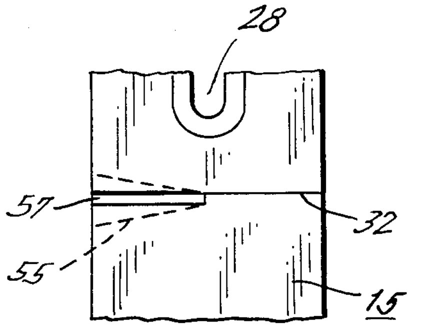
FIG. 5 is a bottom view looking in the direction of arrows 5—5 of FIG. 3 and showing a fragmentary portion of the upper die section.

Now referring to the figures, wherein reference numeral 10 in FIGS. 1 and 2 designates apparatus constructed in accordance with teachings of the instant invention for folding edges 12, 13 (FIG. 7) of tape 11 inwardly and pressing folded edges 12, 13 against the upper and lower surfaces, respectively, of main central section 14 of tape 11. When tape 11 is to be used to construct a so-called folded tape shield (not shown), tape 11 consists of a very thin plastic layer, one side of which is covered with a very thin electrical conducting metal layer.

Folding apparatus 10 includes upper and lower die sections 15, 16 which are biased toward one another by coiled compression springs 17, 18 that surround the upper portions of the respective shafts 21, 22 of the respective adjusting screws 23, 24. Shafts 21, 22 extend through elongated clearance slots 27, 28 in upper die section 15, and the lower threaded ends of shafts 21, 22 are received by threaded apertures 19 in lower die section 16. Springs 17 and 18 bear against the upper surface of upper die section 15 and against heads 25, 26, respectively, of adjusting screws 23, 24 so that upper die section 15 is biased downward toward lower die section 16. There is a very shallow working gap 20 between the confronting or working surfaces of die sections 15 and 16. The thickness of this gap is established by shims 31, 32 that are secured to the respective lower and upper die members 16, 15 by adhesive. Typically, shims 31, 32 are constructed of one or more layers of tape having pressure actuated adhesive on one surface thereof. Shims 31, 32 are clear of clearance slots 27, 28 for adjusting screw shafts 21, 22, and extend along the outboard edges of the respective slits 58, 57 and continues downstream thereof.

Figure 6:
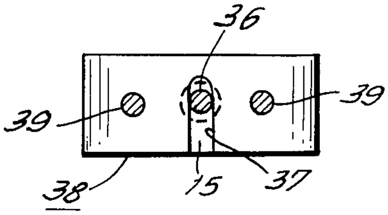
FIG. 6 is a side elevation of the upper die section, looking in the direction of arrows 6—6 of FIG. 1, and illustrating the manner in which the width adjusting screw is connected to the upper die section.

Four screws 29 rigidly secure one end of lower die section 16 to the horizontal leg of L-shaped block 30. The lower surfaces of lower die section 16 and block 30 are coplanar. The vertical leg of block 30 is provided with a threaded aperture through which the threaded shaft 33 of width adjusting screw 35 extends. The right end of screw 35, as seen in FIGS. 1 and 2, is provided with a large knurled head 34. In a region spaced slightly from the left end of screw 35, shaft 33 thereof is provided with reduced diameter portion 36 that is captured within an inverted U-shaped slot 37 (FIG. 6) of plate 38 that is secured by screws 39 to the right end of upper die member 15. For a reason to be hereinafter explained, upper die member 15 may be moved left and right with respect to FIG. 1 by rotation of adjusting screw 35.

Block 30 is pivotally secured to base plate 39 by hinge means 40 so that the assembly of die sections 15, 16 may be pivoted about hinge 40 as it centers to a desired position wherein gap 20 is generally aligned with main section 14 of tape 11 as it approaches gap 20. The left end of upper die section 15 is provided with a threaded aperture through which threaded shaft 41 of adjusting screw 45 extends. Enlarged knurled head 42 is secured to the upper end of screw shaft 41 and the lower end 43 thereof bears against base plate 39. Thus, as screw 45 is rotated, die sections 15, 16 will pivot about hinge 40 as a center and gravity will maintain these elements in adjusted position.

Figure 7:
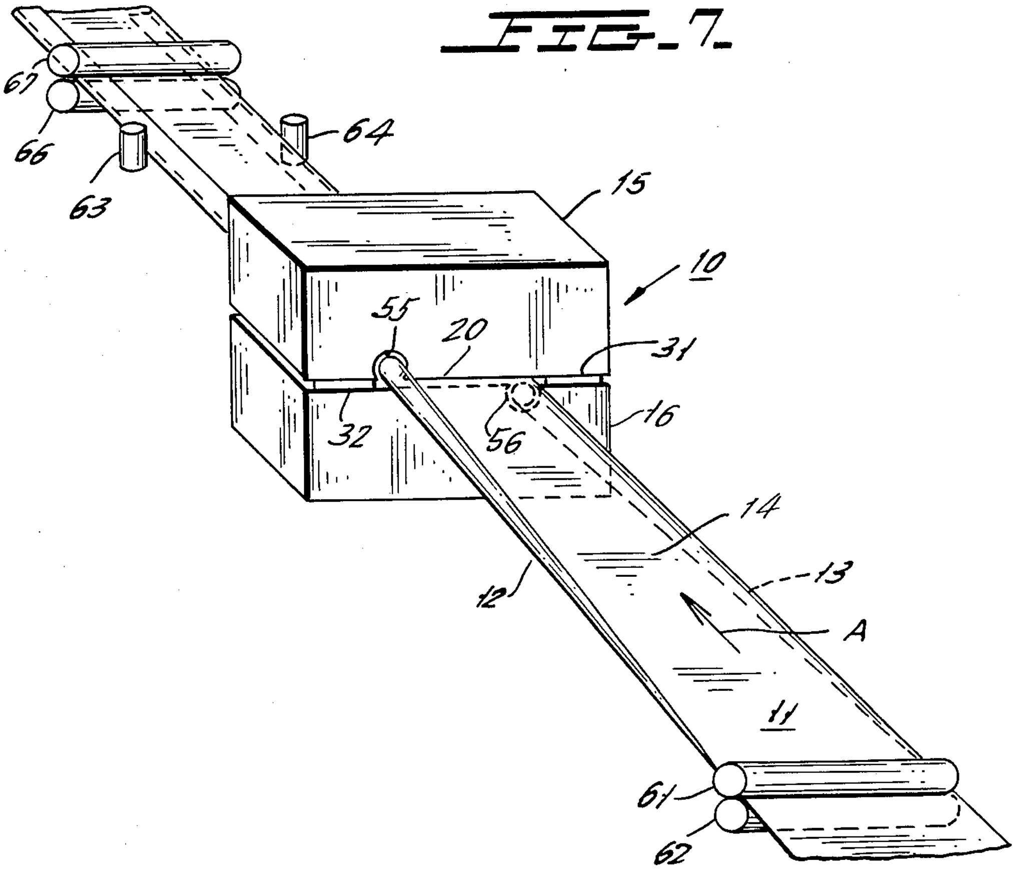
FIG. 7 is a simplified perspective of the die elements with a tape shown passing therebetween.

Upper and lower die sections 15 and 16 are provided with respective conical folding recesses or chambers 55, 56 that extend longitudinally or in the direction of tape travel indicated by arrow A in FIG. 7. The bases of conical recesses 55, 56 are open at the upstream ends of die sections 15 and 16, and recesses 55, 56 for the full lengths thereof communicate with gap 20 through the respective slits 57, 58.

Figure 8A:
FIG. 8A is a transverse cross-section of the tape prior to folding thereof.
Figure 8B:
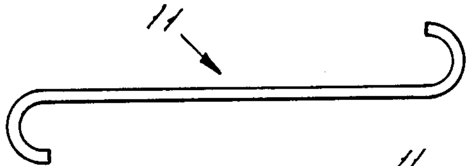
FIG. 8B is a transverse cross-section of the partly-folded tape portion passing through the tapered folding chambers.

Operation of folding apparatus 10 will be readily understood by examining the perspective view of FIG. 7 wherein upper and lower die sections 15 and 16 are shown in simplified form. Biasing spring 17, 18 and other elements shown in FIGS. 1 and 2 as being mounted to die sections 15, 16 are not shown in FIG. 7. Folding apparatus 10 is intended to transform tape 11 of uniform cross-section across its width (FIG. 8A) to a condition in which edges 12, 13 are folded inward, with edge 12 lying against the upper surface of the tape's main central section 14 and edge 13 lying against the lower surface of the tape's main section 14.

Figure 8C:
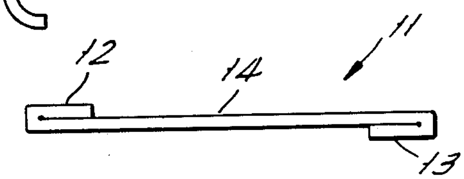
FIG. 8C is a transverse cross-section of the fully folded tape.

While moving longitudinally downstream in the direction indicated by arrow A, flat tape (FIG. 8A) passes between pinch rollers 61, 62 . Downstream of rollers 61, 62 tape edges 12, 13 begin to curl gradually and are substantially curled as main tape section 14 enters gap 20 and edges 12, 13 enter the respective folding chambers 55, 56 through their wide mouth upstream ends. In chamber 55, curling of edge 12 is accelerated and edge 12 is directed through slit 57 into gap 20. At the apex or downstream end of chamber 55, edge 12 is folded flat against the upper surface of main section 14 (FIG. 8C) and remains in this position as it moves between the downstream end of chamber 55 and the downstream end of gap 20. By this time, the fold of edge 12 is firmly set and the folded tape moves between laterally adjustable vertical side guides 63, 64 and then between pinch rolls 66, 67. The downward and inward folding of tape edge 13 by folding chamber 56 takes places in the same manner as tape edge 12 was folded while being drawn through conical chamber 55.

Upper and lower die sections 15 are constructed of blocks of plastic material that is machinable. The nature of this plastic material is such as to provide relatively low friction engagement between the confronting or working surfaces on opposite sides of gap 20 and tape passing therethrough. Suitable materials for die sections 15 and 16 include nylon, Teflon, Corian and acrylic.

For accommodating tapes of different widths, the spacings between folding chambers 55, 56 are adjusted by rotating screw 35 to move upper die section 15 transversely (to the left or right with respect to FIG. 1) as required relative to lower die section 16 which is relatively fixed in the transverse direction. The spacings between folding chambers 55, 56 are also adjustable to determine the widths of the folded tape edges. All of the adjusting elements (screws 23, 24, 35 and 45) are hand operable while tape 11 is moving through gap 20. To facilitate threading of tape into gap 20 and chambers 55, 56, screws 23, 24 are adjusted to reduce the compression or loading of springs 17, 18. This reduces the biasing force tending to close gap 20 and permits die sections 15, 16 to be separated easily to the extent required for threading of the tape.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Apparatus for folding a moving tape along at least one longitudinally extending fold line, said apparatus including:
   - a first die section having a first working face;
   - a second die section having a second working face confronting said first working face in closely spaced relationship to form a shallow gap disposed along a working path for a longitudinally moving tape that extends through said gap;
   - each of said die sections having an elongated longitudinally extending tapered folding recess with a longitudinally extending elongated slit in the associated working face communicating with said folding recess;

each of said folding recesses being spaced apart along said gap;

each said folding recess, at its upstream end, having a relatively large mouth that is open at an upstream facing surface of the respective first or sescond die section at which one end of the slit is open;

each said mouth being operatively disposed to provide an entrance into the associated folding recess for an edge portion of a tape that is moving longitudinally and along said working path through said gap;

each said folding recess being shaped to curl such edge portion inward and direct same through said slit into said gap to form a tape fold line that extends longitudinally downstream from said slit; and means for adjusting relative positions of the recesses along said gap.

2. Apparatus as set forth in claim 1, also including biasing means urging said working faces toward one another.

3. Apparatus as set forth in claim 1, in which each tapered folding recess is generally conical.

4. Apparatus as set forth in claim 1, in which the working faces are constructed of plastic material.

5. Apparatus as set forth in claim 4, in which the plastic material possesses anti-friction qualities similar to those of machinable nylon.

6. Apparatus as set forth in claim 2, in which the biasing means is adjustable while tape is moving through the slot.

7. Apparatus as set forth in claim 1, in which the adjusting means is adjustable while tape is moving through the slot.

8. Apparatus as set forth in claim 2, also including shim means interposed between the die sections to limit the minimum thickness of the gap.

9. Apparatus as set forth in claim 8, in which the shim means is disposed outboard of the gap.

10. Apparatus as set forth in claim 9, in which the shim means includes first and second sections disposed adjacent opposite sides of the gap.

11. Apparatus as set forth in claim 1, also including means for adjusting the angular position of a plane in which the gap is disposed whereby the gap is adjustable to operative alignment with tape entering the gap.

12. Apparatus as set forth in claim 1, also including a longitudinally extending pivot mounting disposed outboard of one side of the gap, and means for adjusting said apparatus by tilting same about said pivot to a position wherein the gap is in operative alignment with tape entering the slot.

13. Apparatus as set forth in claim 1, in which the working faces extend for a substantial distance downstream of said slits.

14. Apparatus as set forth in claim 1, each of the folding recesses being positioned and shaped such as to cause edge curling of the tape in opposite directions from a main central section.

15. The apparatus of claim 14 wherein the configurations of the recesses are such as to fold each of the tape edge sections substantially 180° with respect to the central section.

16. Apparatus as set forth in claim 8, in which the shim means includes first and second sections disposed adjacent apposite sides of the gap and outboard thereof; said first and second sections each having a respective edge disposed along the outboard edge of a different one of said elongated slits.

17. Apparatus as set forth in claim 16, in which the first and second sections are secured to the respective first and second die sections.

18. Apparatus as set forth in claim 17, in which the first and second sections extend downstream of the slits.

* * * * *